United States Patent [19]
Moore

[11] Patent Number: 5,354,350
[45] Date of Patent: Oct. 11, 1994

[54] CITRATE SOLUBLE SLOW RELEASE IRON HUMATE

[75] Inventor: William P. Moore, Hopewell, Va.

[73] Assignee: The Vigoro Corporation, Chicago, Ill.

[21] Appl. No.: 165,958

[22] Filed: Dec. 14, 1993

[51] Int. Cl.$^5$ .................... C05F 11/02; C05B 21/00; C05G 3/00

[52] U.S. Cl. ........................................ 71/24; 71/33; 71/34; 71/64.11; 71/DIG. 2; 210/710; 210/724; 210/770; 210/917; 426/807

[58] Field of Search ............... 71/24, DIG. 2, 64.11, 71/33, 34; 210/710, 724, 720, 917; 426/807

[56] References Cited

U.S. PATENT DOCUMENTS 5,213,692 5/1993 Hjersted ..................... 210/709
5,302,180 4/1994 Hjersted ..................... 71/DIG. 2

*Primary Examiner*—Ferris Lander

[57] ABSTRACT

A new slow releasing particulate iron humate agricultural nutrient composition exhibiting substantially complete solubility of its iron content in soil solutions as indicated by neutral citrate solubilities, and almost no solubility in water, and a new method for preparing the composition. The method comprises admixing and co-reacting iron humate with about equimolar amounts of a divalent metal oxide, an aqueous hydroxide of a monovalent Lewis acid, and a water soluble inorganic phosphate. The iron humate amounts to between 20 and 70 percent of the nutrient particles, and the reaction is carried out at temperatures between 60° and 150° C. for between 4 and 25 minutes.

18 Claims, No Drawings

CITRATE SOLUBLE SLOW RELEASE IRON HUMATE

BACKGROUND OF THE INVENTION

1. Field of the Invention

This invention relates to slow release iron agricultural nutrients based on iron humate, and a method for their preparation. More particularly, this invention relates to a composition and a method for preparing the new slow releasing iron humate agricultural nutrient composition, which substantially completely releases its iron contents in soil solutions. The new method relates to the discovery that the coreaction of iron humate, a divalent metal oxide, an aqueous hydroxide of a monovalent Lewis acid, and a water soluble inorganic phosphate, produces hard, homogeneous, particles containing iron which is substantially insoluble in water, but soluble in agricultural soil solutions.

2. Description of Related Art

Iron is an essential nutrient in the growth of plants. It is usually absorbed by the roots of plants in ionic form from soil solutions. Iron deficiencies have been observed in many plant species where iron solubilities in the soil solution are insufficient to provide the plant iron requirements.

The amount of iron in the soil solution in relation to the amounts of other elements is as important in some instances as the absolute quantities of iron. Excess iron in the soil solution can cause plant deficiencies in other nutrients, such as manganese, copper, and molybdenum, even though ordinarily sufficient amounts of those nutrients are present in the soil.

Where fertilizers containing substantially water soluble iron are used around cement, brick, or ceramic walks, roads, floors, and walls, the surfaces are frequently stained with dark brown colored spots where the fertilizer granules contact the surfaces. The term substantially is used herein to mean mainly or more than one half.

The need for carbon in soils in which plants are grown has been well proved, and investigators have shown quantitatively the effectiveness of optimum ratios of carbon to nutrient, particularly nitrogen, ratios in the soil. Humates and humic acids are effective sources of soil carbon and additionally improve the condition of soils for growing plants.

Hjersted, in U.S. Pat. No. 5,213,692, disclosed a method for providing nutrients and organic matter to soil for use by vegetation, and a method for the preparation of iron humate by treatment of humate colored raw water, under controlled pH conditions, with an iron salt coagulant. Hjersted separated the precipitated iron humate product, concentrated and dried it. The iron humate recovered exhibited an iron solubility of less than 1 part per million parts of water. When he mixed the iron humate with nitrogen from urea or ammonia, he increased iron solubility in water to about 0.05 percent.

Soil is a heterogeneous, polydisperse system of solid, liquid and gaseous components. In this heterogeneous system, the soil solution acts as a medium by which chemical reactions between members of the different and the same soil phases are made possible, even when the reactants are not in direct contact. Nutrients to be effective in the growth of plants must be soluble in the soil solution which comprises soluble and insoluble cation exchange moieties, and organic and inorganic moieties. Soil solutions vary considerably in nature, and one solution may not be used to exactly duplicate each one's properties. However, neutral citrate solutions are used to indicate availability of nutrients to plants through the soil solutions, particularly in the cases of phosphate and iron nutrients.

To find iron nutrients with good availability of iron to plants, it has been a goal of researchers to find and produce iron nutrient compositions which have substantially complete solubilities in neutral aqueous citrate solution. The method to determine Citrate-Soluble Phosphorous in Fertilizers is defined in AOAC Official Methods of Analysis, 15th Edition, 1990 in Method 960.01. The same method may be used for Citrate-Soluble Iron using the AOAC Method 980.01 for iron instead of the phosphorous determination.

There exists an important need for an iron agricultural nutrient composition which is practically insoluble in water and substantially completely soluble in soil solution as indicated by solubility in aqueous neutral citrate solution, and for a method for effectively preparing such a composition.

In the preparation of agricultural nutrients, reactions involving acids and bases have been used. The term Lewis acid is used to define an ion, or molecule, that can combine with another ion, or molecule, by forming a covalent bond with two electrons from the second ion, or molecule. Hydrogen ion (proton) is the simplest substance which will do this, but many other ions such as ammonium ion, potassium, and sodium will also do this. Ammonium, sodium, and potassium hydroxides are hydroxides of Lewis acids.

SUMMARY OF THE INVENTION

I have discovered that iron humate, exhibiting low iron solubility in aqueous neutral citrate solution and poor handling and use physical properties, may be chemically coreacted with divalent metal oxide, aqueous hydroxide of a Lewis acid, and water soluble inorganic phosphate, in a new method to form a new particulate, slow releasing, agricultural nutrient composition, which exhibits water insolubility and substantially complete solubility in soil solutions, as indicated by solubility in aqueous neutral citrate solution, and excellent handling and physical properties.

It was found that the slow releasing particulate solid iron humate agricultural nutrient composition, containing between 20 and 70 percent iron humate and between 30 and 80 percent chemically coreacted divalent metal oxide, hydroxide of a monovalent Lewis acid, and a water soluble inorganic phosphate formed in the new method, and exhibiting water insolubility and substantially complete solubility in soil solutions of its iron content, are excellent agricultural nutrients for plants and animals.

DETAILED DESCRIPTION OF THE INVENTION

I have discovered a new and effective method of preparing a slow releasing particulate iron humate agricultural nutrient composition which is practically insoluble in water yet is substantially completely soluble in soil solutions. Iron contents between 5 and 25 percent in the composition are required to provide a useful amount of iron and to allow sufficient reactants to make the iron soluble in the soil solution. The variation in iron content is caused to some extent by the variations of iron concentrations in the iron humates available for use in the instant method.

Iron humate, amounting to between 20 and 70 percent of the final agricultural nutrient, is admixed with a divalent metal oxide. That mixture is then admixed and reacted with an aqueous hydroxide of a monovalent Lewis acid, and then reacted with a water soluble inorganic phosphate.

For the method to effectively form iron nutrient, soluble in soil solution, the divalent metal oxide, the hydroxide of a monovalent Lewis acid, and the water soluble inorganic phosphate moieties must be admixed and reacted in about equimolar amounts, and the chemically coreacted moieties must amount to between 30 and 80 percent of the dry particulate agricultural nutrient.

Temperatures between 60° and 150° C. are necessary during the coreaction so that the reactants react sufficiently to form homogeneous particles of iron humate agricultural nutrients which are practically water insoluble yet substantially completely soluble in soil solutions.

The term practically water insoluble is used to denote iron solubilities of a few hundredths of a percent, or less, and substantially completely soluble in soil solution is used to denote iron solubilities of more than half in neutral aqueous citrate solution using the AOAC Method 980.01 method for available iron.

The divalent metal oxide may be used effectively in the hydrated or hydroxide form because the reaction is carried out in aqueous media. However, it is usually more convenient to handle the dry metal oxides and allow hydration to occur during the admixing with the other aqueous ingredients.

Divalent metal oxides are usually valuable agricultural nutrients, and those oxides found to be most effective in the instant method are oxides of magnesium, manganese, zinc, copper, iron, cobalt, and calcium.

Iron humate may be obtained in any practical manner and used effectively. It may be formed by, for example, the coagulation-clarification of humate colored raw water.

Lewis acids define a very large number of electron accepting ions or molecules. The materials which perform effectively as reactants in the instant method are only the hydroxides of monovalent Lewis acids. The preferred hydroxides are potassium hydroxide, sodium hydroxide, and ammonium hydroxide. The divalent hydroxides such as calcium hydroxide are ineffective.

Phosphates, to be effective in the instant invention, must be water soluble. Only inorganic, water soluble, phosphates provide the reactivity required to produce the coreaction to form water insoluble-citrate soluble iron in slow release particles. Organic phosphates and insoluble phosphates do not react effectively in the method.

The water soluble inorganic phosphates may be reacted with the aqueous hydroxide of monovalent Lewis acid prior to its use in the instant method, so long as the phosphate remains water soluble before its reaction with the divalent metal oxide and iron humate.

The preferred water soluble inorganic phosphates are one, or a combination, of the following phosphates: phosphoric acid, monoammonium phosphate, diammonium phosphate, monopotassium phosphate, dipotassium phosphate, polyphosphoric acid, and ammonium polyphosphate.

Although the instant method is conveniently performed in a stepwise batch manner, it is economically carried out in a continuous manner whereby iron humate, divalent metal oxide, monovalent hydroxide of a Lewis acid and a water soluble inorganic phosphate are continuously charged to a continuous reactor in Which admixing and coreacting steps are continuously conducted under the same closely controlled conditions as in the batch method, and from which the homogeneous particles of iron humate agricultural nutrients are continuously discharged.

Surprisingly, by use of the instant method iron humate exhibiting low iron solubility in aqueous citrate solution and poor physical properties is converted to a new slow releasing particulate iron humate agricultural nutrient composition exhibiting a high degree of water insolubility and substantially complete solubility in soil solutions of its iron content, as indicated by solubility in neutral aqueous citrate solution. The new composition must contain between 20 and 70 percent iron humate and between 30 and 80 percent of chemically combined divalent metal oxide, aqueous hydroxide of a monovalent Lewis acid, and a water soluble inorganic phosphate to provide an iron content of between 5 and 20 percent.

The new composition functions well to provide iron slowly and continuously through the soil solutions to growing plants and does not cause iron toxicity, and does not cause interactions to create deficiencies of other metallic plant nutrients. The new composition may be used around walls, floors, and walkways without rusty looking discoloration by occasional particles contacting the surfaces.

Iron is an essential nutrient in animal feeds. The new composition functions effectively as an animal feed source of iron. The iron of this composition enters the blood stream of animals more effectively than other commercial iron sources now in use in the feed industry.

Plant nutrients are used more effectively as granules than as random particles in commercial operations requiring minimum labor, and machinery. Attrition resistant granules produce a minimum amount of dust and plant food segregation. The new method provides attrition resistant granules of iron humate which preferably contain between 6 and 20 percent iron, with substantially all of the iron insoluble in water and soluble in neutral aqueous citrate. In this preferred method, iron humate powder, amounting to between 40 and 60 percent of the granular plant nutrient, is admixed with a divalent metal oxide powder, and with a water soluble salt formed by reaction of a hydroxide of a monovalent Lewis acid and phosphoric acid. This mixture is then reacted with phosphoric acid. To be effective, the divalent metal oxide, the hydroxide of monovalent Lewis acid, and the total phosphate moieties must be used in closely controlled molecular ratios. The molar ratios must be held between 1 and 1.2 for each of the three moieties, so that each will participate in the coreaction with iron humate. The total amounts of these reactants must be controlled so that they form between 60 and 40 percent of the granular plant nutrient. The term powder is used to denote finely divided solid particles.

Excellent operations and nutrient effectiveness are obtained when the salt of phosphoric acid and a hydroxide of a monovalent Lewis acid, and phosphoric acid are combined in a ratio to form plant nutrient granules exhibiting a near-neutral pH between 6 and 7.5.

Homogeneous, attrition resistant granules of iron humate plant nutrients are best formed where the admixing and reacting is carried out at a temperature between 80° and 125° C. for a period of time amounting to between 4 and 25 minutes. Lower reaction temperatures provide soft, damp granules and higher temperatures damage the physical integrity of the iron humate, with combustion of the humates sometimes occurring at temperatures slightly above 150° C. The reaction and mixing is incomplete with less than 4 minutes reaction time and more than 25 minutes causes finer than desired granular nutrients.

It is possible to carry out the instant method where all of the phosphate moieties are admixed and reacted as a water soluble salt of a hydroxide of a monovalent Lewis acid and phosphoric acid, and the method may be used effectively where a soluble phosphate salt, such as monoammonium phosphate, is economically available. However, the method may also be operated for reasons of method efficiency and economics where about half of the admixed and reacted phosphate moieties are derived from a water soluble salt of a hydroxide of a monovalent Lewis acid and phosphoric acid, and about half from phosphoric acid.

In the preferred method of producing attrition resistant granules of iron humate plant nutrient, the iron humate may be derived as a precipitated coagulation product resulting from the clarification of humate colored water by treatment with iron salts. Where such a precipitated product is unavailable, or where higher concentrations of iron in iron humate are desired, iron humate derived from other sources may be used.

The reactions in the instant method are exothermic and create sufficient heat to evaporate moisture from the granular product. It is possible to increase the moisture removal by supplying hot air directly to the reaction mixture. Depending somewhat upon the amount of water included in the iron humate and the other reactants used in the instant method, it is usually desirable, for optimization of nutrient concentrations and physical properties, to dry the iron humate plant nutrients further in a separate dryer using air at temperatures between 100° and 200° C., until the moisture content in the nutrient is between 1 and 7 percent. Granule friability increases rapidly at moisture contents below 1 percent, and handleability and nutrient concentrations undesirably decrease with more than 7 percent moisture. Drying is slow with air temperature below 80° C. and fire hazards occur at temperatures above 200° C.

The method of preparing attrition resistant granules of iron humate plant nutrient may be economically and effectively carried out on a continuous basis whereby the iron humate powder, divalent metal oxide powder, water soluble salt formed by reaction of a hydroxide of a monovalent Lewis acid and phosphoric acid, and aqueous phosphoric acid are continuously charged to, admixed in, coreacted in, and discharged from, a continuous reactor as homogeneous attrition resistant granules of iron humate. The continuous reactor must provide for high-shear mechanical mixing and plug flow dynamics in the system. Plug flow dynamics preclude appreciable back-mixing and the presence of unreacted ingredients in the product discharged from the reactor. Plug flow dynamics are best achieved by use of a long thin tubular reactor having a length to diameter ratio higher than 3 to 1. Alternatively, plug flow dynamics may be approached by use of a compartmented mixer-reactor to prevent back mixing.

When the preferred method is used, an attrition resistant granular iron humate plant food composition is formed which comprises between 40 and 60 percent iron humate and between 60 and 40 percent of chemically combined divalent metal oxide, water soluble salt of a monovalent Lewis acid hydroxide and phosphoric acid, containing between 6 and 20 percent iron, substantially all of which is insoluble in water and soluble in aqueous neutral citrate solution. The composition functions well as a slow releasing iron plant nutrient.

MODE OF OPERATION OF THE INVENTION

Having described the basic concepts of the instant invention, reference is now made to the following examples which are provided to illustrate the new method of preparing a slow releasing particulate iron humate agricultural nutrient exhibiting practically zero iron water solubility and substantially complete solubility in aqueous neutral citrate solution, and to illustrate the efficacy as agricultural nutrients of the new compositions prepared by the instant method.

EXAMPLE 1

This example demonstrates the instant invention by providing specific ingredients and conditions for the batch method.

Preparation of slow releasing particulate iron humate agricultural nutrient was carried out in an Eirich Model R-08 mixer reactor constructed of stainless steel 304, consisting of a 92 centimeter (cm) diameter by 92 cm tall pan equipped with a drive apparatus and sealing ports on the top and bottom of the pan. The pan contained an agitator consisting of 6 flat blades made from 7.6 cm high by 1.25 cm thick hardened steel bars welded to the end of a hardened steel shaft. The bar agitator describes a diameter of 30 cm when it rotates with the bottom of the agitator located at 7.5 cm above the floor of the pan. Arrangements were made for the pan to operate in a clockwise manner and the agitator also rotated in a clockwise manner. The blades of the agitator operated within about 1.25 cm of the rotating pan's vertical wall. The pan was equipped with a stationary scraper to remove material from the wall, located at about 3 o'clock compared to the closest point of the agitator at 8 o'clock. The pan was fitted with a vent to discharge vapors through a scrubber and stack. The apparatus was operated at about atmospheric pressure.

The pan was charged at ambient temperatures with iron humate powder admixed with the divalent metal oxide powder, magnesium oxide powder, and the water soluble phosphate, diammonium phosphate powder, in the amounts listed as follows:

| Materials | Kilograms |
| --- | --- |
| Iron Humate, 20% Fe, 20% $H_2O$ | 28.1 |
| DAP, 18-46-0 | 7.0 |
| Magnesium Oxide, 57% Mg | 3.8 |

While the pan was rotating at 15° from its vertical axis at 46 RPM, and the agitator was rotating at 533 RPM, black phosphoric acid preheated to 65° C., containing 53 percent $P_2O_5$ and amounting to 6.1 kilograms, was added evenly through a two minute period. The molecular ratios of the magnesium, phosphate, and ammonium moieties were 1.00, 1,00, and 0.992, respectively, and the iron humate amounted to 60 percent of the final product on a dry basis.

The temperature of the mixture increased to 107° C. as the exothermic coreaction took place. The apparatus continued to operate for 10 minutes after addition of the phosphoric acid was completed, and the system cooled on completion of the reaction as moisture evaporated from the homogeneous granules formed.

The granular products were discharged at 91° C. and dried in a Witte vibratory fluid bed dryer operating with an exit air temperature of 88° C. Granular product recovered amounted to 37.0 kilograms. It was analyzed for the chemical properties, which are listed as follows:

| Component | Wt % |
| --- | --- |
| Nitrogen, total N | 3.24 |
| CWIN | 2.21 |
| Phosphate, total $P_2O_5$ | 16.6 |
| Citrate soluble $P_2O_5$ | 12.1 |
| Magnesium, total Mg | 5.6 |
| water soluble Mg | 0.5 |
| EDTA soluble Mg | 4.9 |
| Iron, total Fe | 14.4 |
| water soluble Fe | <0.01 |
| citrate soluble Fe | 12.00 |
| Moisture | 4.01 |

Water solubility of the iron was about 0.01 percent of the total iron while the iron soluble in soil solution, as indicated by the iron soluble in neutral citrate solution, was substantially complete at 87.5 percent.

The initial iron humate which was recovered from iron coagulation-clarification of humate colored water was dried before use to 80 percent dry matter and analyzed. It contained 20.9 percent iron, of which 32 percent was soluble in neutral citrate solution, indicative of availability to plants by solubility in the soil solution.

The granular product exhibited a pH of 6.9. The granules which were primarily in the $-6+16$ U.S. mesh screen size range required an average of 1.7 kilograms weight to fracture, and showed little tendency to form dust after extended handling. The original iron humate exhibited no physical integrity.

EXAMPLE 2

This example demonstrates the instant invention by providing specific ingredients and conditions for the continuous method for reacting aqueous hydroxide of monovalent Lewis acid, manganous metal oxide powder, phosphoric acid and iron humate to form highly available iron nutrient granules.

A steam jacketed horizontal cylinder having an internal volume of 300 liters with a length to diameter ratio of 3.2/1 was used to prepare granular nutrient from the same iron humate starting material used in Example 1. The cylinder was fitted with 2 plows rotating tangentially to the inside wall of the cylinder at 500 RPM and shaped to throw the contents toward the center of the cylinder. The cylinder was also fitted with two choppers operating perpendicularly to the internal wall at a speed of 3000 RPM, describing chopping circles of 15 centimeters on shafts entering the cylinder at the 3 o'clock position 25 and 75 percent of the way along the length of the cylinder. The choppers consisted of 4 sharp steel blades attached to a shaft as close to the wall of the cylinder as possible The cylinder was equipped with a fluid addition nozzle 10 percent along from the inlet end, and with a level controlling overflow dam at the discharge end. The dam was set to allow the cylinder to operate about 40 percent full of solids.

Premixed powder and aqueous hydroxide of a monovalent Lewis acid reactants were continuously charged to the inlet end of the steam jacketed reactor as follows:

| Reactants | Continuous Feed Rate, KG/Min |
| --- | --- |
| Iron Humate, 20.9% Fe, 80DM | 4.33 |
| Manganous Oxide, 62% Mn | 2.00 |
| Potassium hydroxide, 47% KOH | 2.69 |

To this mixed material was admixed by spraying through the fluid addition nozzle, black phosphoric acid containing 53 percent $P_2O_5$ at the rate of 3.0 KG per minute. Admixing and exothermic coreaction took place as the reactants moved in a near-plug-flow manner with high shear mixing through the cylindrical, steam jacket heated, reactor for a retention time of 7 minutes, reaching a maximum temperature of 85° C. near the discharge end of the reactor.

The iron humate based agricultural nutrient flowed continuously over the discharge dam, and was continuously dried to a moisture content of 5.1 percent in a Witte fluid bed dryer, and analyzed to provide the results recorded as follows:

| Component | Wt % |
| --- | --- |
| Potassium, total $K_2O$ | 11.5 |
| Water insoluble $K_2O$ | 8.4 |
| Phosphate, total $P_2O_5$ | 17.4 |
| Citrate soluble $P_2O_5$ | 9.9 |
| Manganese, total Mn | 13.4 |
| water soluble Mn | 0.7 |
| EDTA soluble Mn | 5.9 |
| Iron, total Fe | 9.9 |
| water soluble Fe | <0.01 |
| citrate soluble Fe | 8.9 |

The iron in the granular nutrients, most of which was in the $-6+16$ U.S. mesh screen size range, was practically insoluble in water and substantially completely available to plants as indicated by the 89.5 percent solubility in neutral citrate solution.

The physical integrity of the product granules was indicated by the 1.7 kilograms average force required to crush a granule. The pH of the product was about neutral at 6.6.

EXAMPLE 3

This example demonstrates the utility and effectiveness of the new agricultural composition as an agricultural nutrient for feeding animals. The product from Example 1 was fed orally as an iron source, along with two other commercially available iron sources, to six litters of pigs which were randomly given one of the three treatments. One third the pigs were orally fed with 75 grams per litter per day with the agricultural nutrient granules containing 14.4 percent iron from Example 1, another third of the pigs were fed 75 grams per litter per day of commercial Pig Oral-Iron, and the final third were injected intravenously with 100 mg iron per day from commercial Iron Dextran.

Blood samples were drawn from each pig in each litter throughout a 30 day test period with hemoglobin determinations made on each sample. The results indicate the excellent availability of the iron nutrient as follows:

| Days after Treatment | Hemoglobin Level, G/DL | | |
|---|---|---|---|
| | Iron Humate | Pig Oral-Iron | Iron Dextran |
| 1 | 10.42 | 10.41 | 9.39 |
| 3 | 7.72 | 7.60 | 8.44 |
| 5 | 9.00 | 7.10 | 9.13 |
| 10 | 11.25 | 9.84 | 9.44 |
| 15 | 11.40 | 10.42 | 10.26 |
| 22 | 13.75 | 11.22 | 9.14 |
| 30 | 11.59 | 10.91 | 7.50 |

EXAMPLE 4

This example demonstrates the utility and effectiveness of the new agricultural composition as an agricultural nutrient for plants.

A plot of iron deficient Merion bluegrass golf fairway turf in western Virginia displayed a light green color and was given a color rating of 5.0 on a scale where 0 indicates dead grass and 9 indicates dark green color, although the well irrigated and drained loam soil contained more than sufficient macronutrients in mid-June. Treatment of the plot with 100 grams per 1000 square foot area of the product from Example 2 containing 9.9 percent iron on June 15, resulted in improving color after 10 days. Color improvement continued so that dark green color and a rating of 8.5 was achieved by the plot by September 1.

I claim:

1. A method of preparing a slow releasing particulate iron humate agricultural nutrient composition which contains between 5 and 25 percent iron which is practically insoluble in water and substantially completely soluble in soil solutions, the method comprising:
   (a) admixing iron humate, amounting to between 20 and 70 percent of the agricultural nutrient composition, with a divalent metal oxide;
   (b) admixing and coreacting with the mixed divalent metal oxide and iron humate, an aqueous hydroxide of a monovalent Lewis acid;
   (c) admixing and coreacting the iron humate, divalent metal oxide, and hydroxide of monovalent Lewis acid with a water soluble inorganic phosphate;
   (d) providing the divalent metal oxide, the hydroxide of monovalent Lewis acid, and the water soluble inorganic phosphate moieties in about equimolar amounts so that they coreact to form between 30 and 80 percent of the agricultural nutrient composition;
   (e) continuing the admixing, and reaction at temperatures between 60° and 150° C. until homogeneous particles of iron humate agricultural nutrients are formed which are practically water insoluble and substantially completely soluble in soil solutions.

2. The method of claim 1 wherein the divalent metal oxide is in a hydrated form.

3. The method of claim 1 wherein the divalent metal oxide is selected from the group of agricultural nutrients consisting of magnesium oxide, manganous oxide, zinc oxide, cupric oxide, ferrous oxide, cobaltous oxide, and calcium oxide.

4. The method of claim 1 wherein the iron humate is a precipitated coagulation product resulting from clarification of humate colored water by treatment with soluble iron salts.

5. The method of claim 1 wherein the aqueous hydroxide of a monovalent Lewis acid is selected from the group consisting of potassium hydroxide, sodium hydroxide, and ammonium hydroxide.

6. The method of claim 1 wherein the water soluble inorganic phosphate is selected from the group consisting of phosphoric acid, polyphosphoric acid, monoammonium phosphate, diammonium phosphate, monopotassium phosphate, dipotassium phosphate, and ammonium polyphosphate.

7. The method of claim 1 wherein the water soluble inorganic phosphate is chemically reacted with the aqueous hydroxide of the monovalent Lewis acid to form a water soluble salt before admixing and reacting with the divalent metal and the iron humate.

8. The method of claim 1 wherein the iron humate, divalent metal oxide, monovalent hydroxide of a Lewis acid, and the water soluble inorganic phosphate are continuously charged to a continuous reactor, in which the admixing and coreacting steps are continuously conducted, and from which the homogeneous particles of iron humate agricultural nutrients are continuously discharged.

9. The slow releasing particulate iron humate agricultural nutrient composition containing between 20 and 70 percent iron humate and between 30 and 80 percent chemically coreacted divalent metal oxide, aqueous hydroxide of a monovalent Lewis acid, and a water soluble inorganic phosphate, which exhibits water insolubility and substantially complete solubility in soil solutions of its iron content of between 5 and 20 percent, prepared by the method of claim 1.

10. The composition of claim 9 wherein the slow releasing iron humate is a new improved plant nutrient.

11. The composition of claim 9 wherein the slow releasing iron humate is a new improved animal feed nutrient.

12. A method of preparing attrition resistant granules of iron humate plant nutrient containing between 6 and 20 percent iron which is substantially insoluble in water and soluble in neutral aqueous citrate, the method comprising:
   (a) admixing iron humate powder, amounting to between 40 and 60 percent of the granular plant nutrient, with a divalent metal oxide powder and a powder of water soluble salt formed by reaction of a hydroxide of a monovalent Lewis acid, and phosphoric acid;
   (b) admixing and reacting the mixed divalent metal oxide powder, the iron humate powder, and the powder of water soluble salt of a monovalent Lewis acid and phosphoric acid, with aqueous phosphoric acid;
   (c) providing the divalent metal oxide, the hydroxide of monovalent Lewis acid, and total phosphate moieties in respective molecular ratios between 1 and 1.2, so that they coreact to form between 60 and 40 percent of the granular plant nutrient;
   (d) providing the water soluble salt of phosphoric acid and the hydroxide of a monovalent Lewis acid, and phosphoric acid in a ratio to form plant nutrient granules with a near-neutral pH between 6 and 7.5;
   (e) continuing the admixing and reaction at a temperature between 80° and 125° C. for a period of time amounting to between 4 and 25 minutes until homogeneous attrition resistant granules of iron humate plant nutrients are formed.

13. The method of claim 12 wherein all of the phosphate moieties are admixed and reacted as a water soluble salt of a hydroxide of a monovalent Lewis acid and phosphoric acid.

14. The method of claim 12 wherein about half of the admixed and reacted phosphate moieties are derived from a water soluble salt of a hydroxide of monovalent Lewis acid and phosphoric acid, and about half from phosphoric acid.

15. The method of claim 12 wherein the iron humate powder is derived as a precipitated coagulation product resulting from clarification of humate colored water by treatment with iron salts.

16. The method of claim 12 wherein the particulate iron humate plant nutrients are dried with hot air at temperatures between 80° and 200° C. until moisture content is between 1 and 7 percent.

17. The method of claim 12 wherein the iron humate powder, divalent metal oxide powder, water soluble salt formed by reaction of a hydroxide of a monovalent Lewis acid and phosphoric acid, and aqueous phosphoric acid are continuously charged to, admixed in, coreacted in, and discharged from as homogeneous attrition resistant granules of iron humate plant nutrients, a continuous reactor which provides high shear mechanical mixing and plug flow.

18. The attrition resistant granular iron humate plant food composition prepared by the method of claim 12 comprising between 40 and 60 percent iron humate, and between 60 and 40 percent of chemically combined divalent metal oxide, water soluble phosphate salt of a monovalent Lewis acid hydroxide, and phosphoric acid, containing between 6 and 20 percent iron, substantially all of which is insoluble in water and soluble in aqueous neutral citrate solution.

* * * * *